(12) United States Patent
Krishna et al.

(10) Patent No.: US 12,270,523 B2
(45) Date of Patent: Apr. 8, 2025

(54) MAGNETICALLY CONTROLLED FLUID DRAIN VALVE FOR AIRCRAFT EXTERIOR LIGHT UNIT

(71) Applicant: Goodrich Corporation, Charlotte, NC (US)

(72) Inventors: Abhilash Krishna, Bangalore (IN); Poly Puthur John, Bangalore (IN); Srijith Purushothaman, Thrissur (IN)

(73) Assignee: GOODRICH CORPORATION, Charlotte, NC (US)

( * ) Notice: Subject to any disclaimer, the term of this patent is extended or adjusted under 35 U.S.C. 154(b) by 478 days.

(21) Appl. No.: 17/852,832

(22) Filed: Jun. 29, 2022

(65) Prior Publication Data

US 2023/0194067 A1 Jun. 22, 2023

(30) Foreign Application Priority Data

Dec. 20, 2021 (IN) .............................. 202141059485

(51) Int. Cl.
*F21S 45/30* (2018.01)
*B64D 47/02* (2006.01)
(Continued)

(52) U.S. Cl.
CPC .............. *F21S 45/30* (2018.01); *B64D 47/02* (2013.01); *F16K 1/42* (2013.01); *F16K 31/08* (2013.01);
(Continued)

(58) Field of Classification Search
CPC . F21S 45/30; B64D 47/02; F16K 1/42; F16K 1/36; F16K 31/08; F16K 31/084; F21V 33/00; F21W 2107/30
See application file for complete search history.

(56) References Cited

U.S. PATENT DOCUMENTS 4,489,754 A 12/1984 Seessle et al.
4,779,640 A 10/1988 Cummings et al.
(Continued)

FOREIGN PATENT DOCUMENTS

DE 102005017328 10/2006
EP 2009649 A2 * 12/2008 ......... F16K 31/0603
GB 1220230 1/1971

OTHER PUBLICATIONS

European Patent Office, European Search Report dated Apr. 24, 2023 in Application No. 22211371.4.

*Primary Examiner* — Patrick C Williams
(74) *Attorney, Agent, or Firm* — SNELL & WILMER L.L.P.

(57) ABSTRACT

An aircraft exterior light unit may comprise a magnetically controlled fluid drain valve configured to expel liquid water from the light unit. The valve may include a permanent magnet configured to induce a magnetic flux circuit that generates a magnetic force configured to close the valve. The valve may be configured to open when the pressure inside the light unit exceeds the magnetic force. As the valve opens and expels the water, the pressure within the light unit may decrease, equalizing with that of the external environment. As the magnetic force generated by the magnet increases as the valve is open and the water expelled, the magnet may be configured to close the valve once more. As such, the magnet may be configured to control a self-acting fluid drain valve in an aircraft exterior light.

20 Claims, 11 Drawing Sheets

(51) Int. Cl.
*F16K 1/42* (2006.01)
*F16K 31/08* (2006.01)
*F21V 33/00* (2006.01)
*F21W 107/30* (2018.01)

(52) U.S. Cl.
CPC ......... *F21V 33/00* (2013.01); *F21W 2107/30* (2018.01)

(56) References Cited

U.S. PATENT DOCUMENTS

| | | |
|---|---|---|
| 5,983,919 A | 11/1999 | Ottinger et al. |
| 6,000,417 A | 12/1999 | Jacobs |
| 8,783,285 B2 | 7/2014 | Kulesha et al. |
| 9,845,898 B1 * | 12/2017 | Johnson ................ F16K 17/02 |
| 2004/0021108 A1 * | 2/2004 | Hallback ............ F16K 31/082 |
| | | 251/65 |
| 2008/0277607 A1 * | 11/2008 | Sawai .................... F16K 31/02 |
| | | 251/65 |
| 2010/0090138 A1 | 4/2010 | Bromley |
| 2017/0074418 A1 * | 3/2017 | Liang ..................... H01F 27/28 |
| 2018/0335150 A1 | 11/2018 | Hessling-Von Heimendahl et al. |
| 2019/0138036 A1 * | 5/2019 | Ohnmacht .......... F16K 31/0655 |
| 2019/0170269 A1 * | 6/2019 | Oulton ................. E21B 23/004 |
| 2021/0215268 A1 * | 7/2021 | Fernandes ............ F16K 31/088 |

* cited by examiner

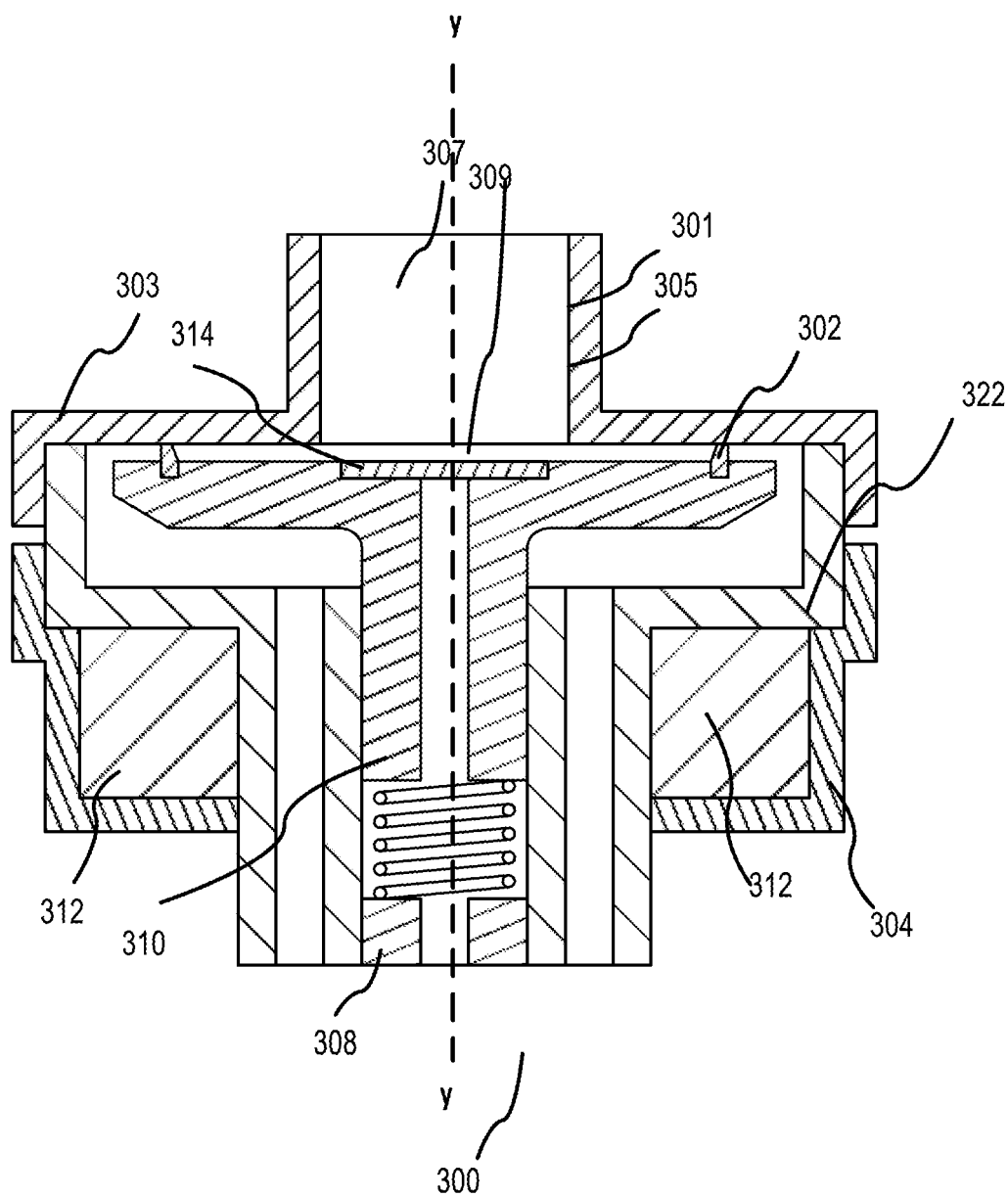
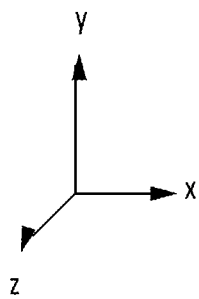
FIG.3A

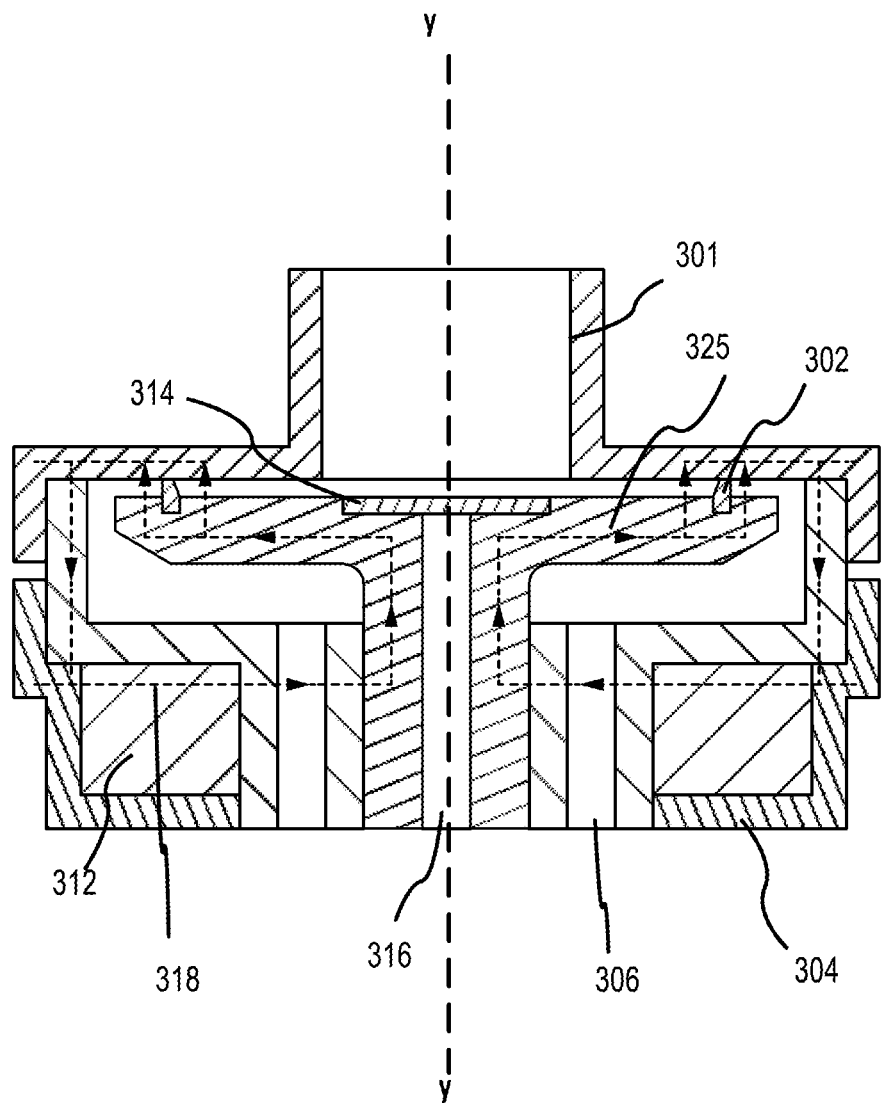
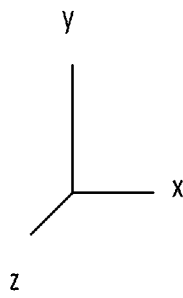
FIG.3B

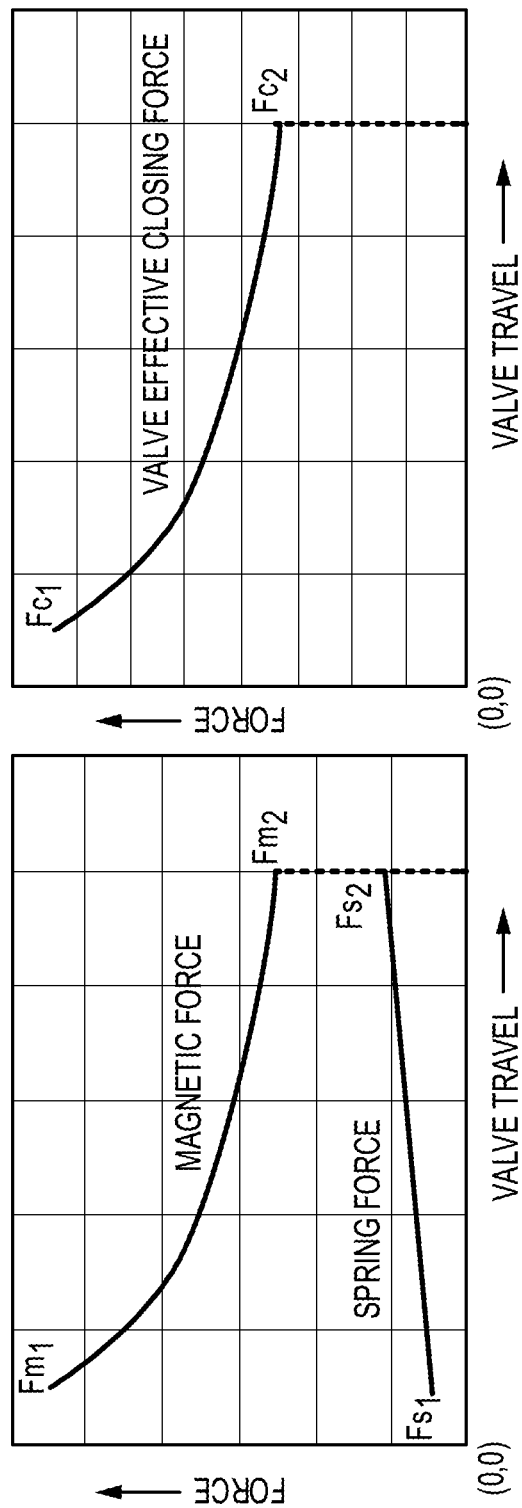

MAGNETICALLY CONTROLLED FLUID DRAIN VALVE FOR AIRCRAFT EXTERIOR LIGHT UNIT

CROSS-REFERENCE TO RELATED APPLICATIONS

This application claims priority to, and the benefit of, India Patent Application No. 202141059485, filed Dec. 20, 2021 (DAS Code 2A5A) and titled "MAGNETICALLY CONTROLLED FLUID DRAIN VALVE FOR AIRCRAFT EXTERIOR LIGHT UNIT," which is incorporated by reference herein in its entirety for all purposes.

FIELD

The present disclosure relates to aircraft lighting systems, and, more specifically, to aircraft exterior lamps and lighting systems.

BACKGROUND

Exterior lighting on an aircraft enhances safety on the ground, during taxiing, and in-flight. Exterior systems often include anti-collision lighting, floor and spotlights, navigation lights and beacons, and emergency lights. These lights, which can be found on the upper and lower fuselage, tail, and wings, are subjected to intense environmental conditions, such as high winds and storms, as well as vast temperature and pressure changes during aircraft climb and descent. These conditions can damage the lighting systems. For example, since the external ambient air pressure varies with flight altitude, the light units are usually vented to avoid excessive overpressure or loss of pressure formed during flight ascent and descent periods. In exchanging air between the interior of an exterior light unit and the environment, water vapor in the air may flow into the exterior light unit and may eventually condense within the unit as the temperature changes. Liquid water build-up may deteriorate light unit functionality, threating operational safety of the entire aircraft.

SUMMARY

An aircraft light unit is disclosed herein. In various embodiments, the aircraft light unit may comprise a lighting housing and a valve. In various embodiments, the valve may comprise an inlet fitting body, an inner body, and a permanent magnet. In various embodiments, the inlet fitting body may have a non-magnetic collar portion and a magnetic shoulder portion. In various embodiments, the collar portion may at least partially define a lighting cavity and couple to the lighting housing at the lighting cavity. In various embodiments, the collar portion may be downstream of the lighting housing. In various embodiments, the shoulder portion may comprise an inner surface at least partially defining an air gap.

In various embodiments, the inner body may have a poppet disposed between the inner surface of the shoulder portion and a seat. In various embodiments, the seat may be configured to support the poppet. In various embodiments, the inner body may define a plurality of cavities. The plurality of cavities may be configured to permit water to drain from the upstream lighting housing.

In various embodiments, the poppet may further comprise a poppet stem. In various embodiments, the poppet stem may define a channel. In various embodiments, the channel may be configured to permit at least one of air and water vapor to pass therethrough. In various embodiments, the poppet may further comprise a membrane. The membrane may be a semi-permeable membrane. In various embodiments, the membrane may be configured to overlay the poppet stem defining the channel. In various embodiments, the membrane may be configured to permit at least one of air and water vapor to pass therethrough. In various embodiments, the membrane may be further configured to be impermeable to liquid water.

In various embodiments, the permanent magnet may be disposed between the inner body and an outer body of the valve. In various embodiments, the magnet may further comprise an inner cylindrical face having a north pole and an outer cylindrical face having a south pole. In various embodiments, the magnet may be radially polarized between the inner cylindrical face and the outer cylindrical face. In various embodiments, the magnet may comprise a plurality of annular segments. The plurality of annular segments may define a plurality of recesses. Each recess may extend between the inner cylindrical face and the outer cylindrical face of the magnet. In various embodiments, the magnet may be a continuous, annular magnet.

In various embodiments, the magnet may be configured to induce a magnetic flux circuit. In various embodiments, the magnetic flux circuit may comprise a plurality of closed loop paths containing a magnetic flux. The magnetic flux may originate from the inner cylindrical face of the magnet. In various embodiments, the magnetic flux may flow through the inner body and up the poppet. In various embodiments, the magnetic flux may traverse the air gap into the magnetic shoulder portion of the inlet fitting body. In various embodiments, the magnetic flux may flow down the inner body and into the outer body. In various embodiments, the magnetic flux may terminate at the outer cylindrical face of the magnet.

A valve for an exterior aircraft light unit is also disclosed herein. In various embodiments, the valve may include an inlet fitting body, an inner body, and a permanent magnet. The inner body may include a poppet, a polymer seal, and a semi-permeable membrane.

In various embodiments, the inlet fitting body may have a non-magnetic collar portion and a magnetic shoulder portion. In various embodiments, the collar portion may at least partially define a lighting cavity. In various embodiments, the shoulder portion may comprise an inner surface at least partially defining an air gap. In various embodiments, the poppet may be disposed between the inner surface of the shoulder portion and a seat. In various embodiments, the seat may be configured to support the poppet. In various embodiments, the poppet may further comprise a poppet stem. In various embodiments, the poppet stem may define a channel. In various embodiments, the channel may be configured to permit at least one of air and water vapor to pass therethrough.

In various embodiments, the polymer seal may be retained within an annular groove of the poppet. In various embodiments, the polymer seal may be configured to couple the poppet to the inner surface of the shoulder portion of the inlet fitting body. In various embodiments, polymer seal may be an O-ring. In various embodiments, the polymer seal may be configured to retain the poppet to the shoulder portion in a seated position.

In various embodiments, the semi-permeable membrane may be configured to overlay the poppet stem defining the channel. In various embodiments, the semi-permeable membrane may be configured to permit at least one of air and water vapor to pass into the channel. In various embodiments, the semi-permeable membrane may be further configured to be impermeable to liquid water. In various embodiments, the liquid water may be configured to accumulate along the membrane.

In various embodiments, the permanent magnet may be disposed between the inner body and an outer body of the valve. In various embodiments, the magnet may be comprised of an inner cylindrical face having a north pole and an outer cylindrical face having a south pole. In various embodiments, the magnet of the valve may be configured to induce a magnetic flux circuit. In various embodiments, the magnetic flux circuit may comprise a plurality of closed loop paths containing a magnetic flux. The magnetic flux may originate from the inner cylindrical face of the magnet. In various embodiments, the magnetic flux may flow through the inner body and up the poppet. In various embodiments, the magnetic flux may traverse the air gap into the magnetic shoulder portion of the inlet fitting body. In various embodiments, the magnetic flux may flow down the inner body and into the outer body. In various embodiments, the magnetic flux may terminate at the outer cylindrical face of the magnet.

In various embodiments, the magnetic flux traversing across the air gap may develop a magnetic force across the air gap. In various embodiments, the magnetic force across the air gap may be configured to attract the poppet to the inner surface of the shoulder portion. In various embodiments, the magnetic force may be configured to close the valve. In various embodiments, the poppet may be configured to move out of the seated position and open the valve when the magnetic force across the air gap is exceeded by a pressure force of the impermeable liquid water acting on the poppet. In various embodiments, the magnetic force across the air gap may decrease as the valve opens.

In various embodiments, the inner body may define a plurality of cavities. In various embodiments, the plurality of cavities may be configured to permit water to drain out of the valve as the valve opens. In various embodiments, the pressure force of the impermeable liquid water accumulated along the semi-permeable membrane may decrease as the water drains out the valve. In various embodiments, the magnetic force across the air gap may be configured to increase as the pressure force of the liquid water within the valve decreases. In various embodiments, the increasing magnetic force across the air gap may shift the poppet back into a seated position.

A method of assembling a valve for an aircraft light unit is also disclosed herein. In various embodiments, the method may comprise assembling a poppet. The poppet may comprise a poppet stem defining a channel. In various embodiments, the channel may be configured to permit at least one of air and water vapor to pass therethrough. In various embodiments, the poppet may further comprise a planar face defining an annular groove. In various embodiments, assembling the poppet may further comprise, installing a polymer seal within the annular groove. The polymer seal may be an O-ring. In various embodiments, assembling the poppet may further comprise overlaying the channel with a semi-permeable membrane. The semi-permeable membrane may be configured to permit at least one of air and water vapor to pass into the channel. The semi-permeable membrane may be further configured to be impermeable to liquid water. The liquid water may accumulate along the membrane.

In various embodiments, the method of assembling the valve may further comprise placing a seat within an inner body of the valve. In various embodiments, the method may further comprise disposing the poppet onto the seat within the inner body. The seat may be configured to support the poppet. The inner body may be configured to house the poppet and the seat. In various embodiments, the method may further comprise setting the inner body within an outer body. The outer body may be configured to ring the inner body. In various embodiments, setting the inner body within the outer body may define a recess between the inner body and the outer body. In various embodiments, the method of assembling the valve may further comprise disposing a permanent magnet within the recess between the inner body and the outer body. The magnet may further comprise an inner cylindrical face having a north pole and an outer cylindrical face having a south pole.

In various embodiments, the method of assembling the valve may further comprise enclosing the valve with an inlet fitting body. The inlet fitting body may be configured to cover the inner body, the magnet, and the outer body. The inlet fitting body may comprise a shoulder portion and a collar portion. In various embodiments, the collar portion may at least partially define a lighting cavity. In various embodiments, the collar portion may be configured to couple to a lighting housing of a lighting unit at the lighting cavity.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 3A illustrates a cross-section view of a magnetically controlled fluid drain valve for an exterior light unit, in accordance with various embodiments;

FIG. 3B illustrates a portion of a cross-section view of a magnetically controlled fluid drain valve for an exterior light unit, including a magnetic flux line, in accordance with various embodiments;

FIG. 7A illustrates a graph showing magnetic and spring force variation during valve opening and closing, in accordance with various embodiments;

FIG. 7B illustrates a graph showing valve effective closing force, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
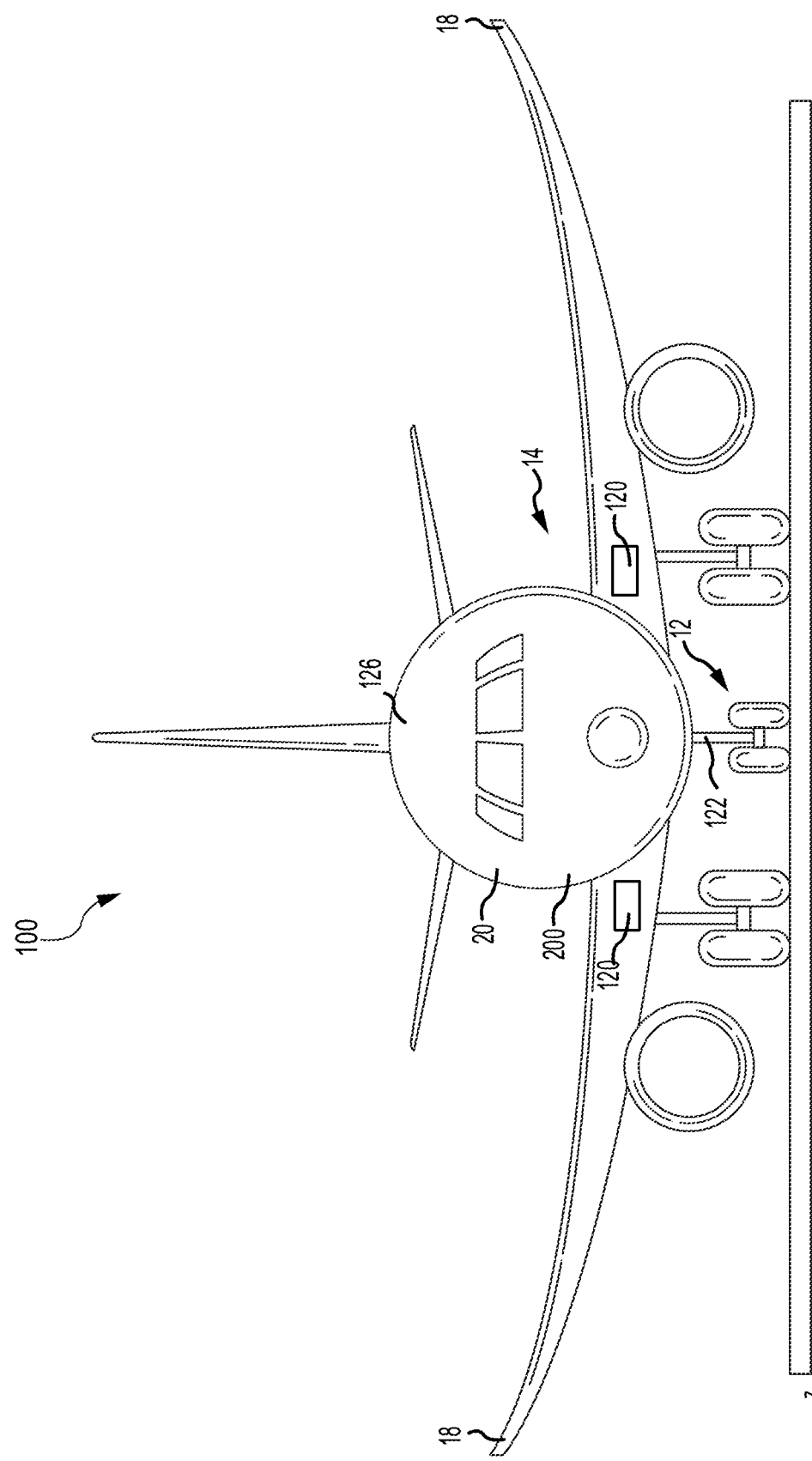
FIG. 1 illustrates an aircraft, in accordance with various embodiments.
Figure 2A:
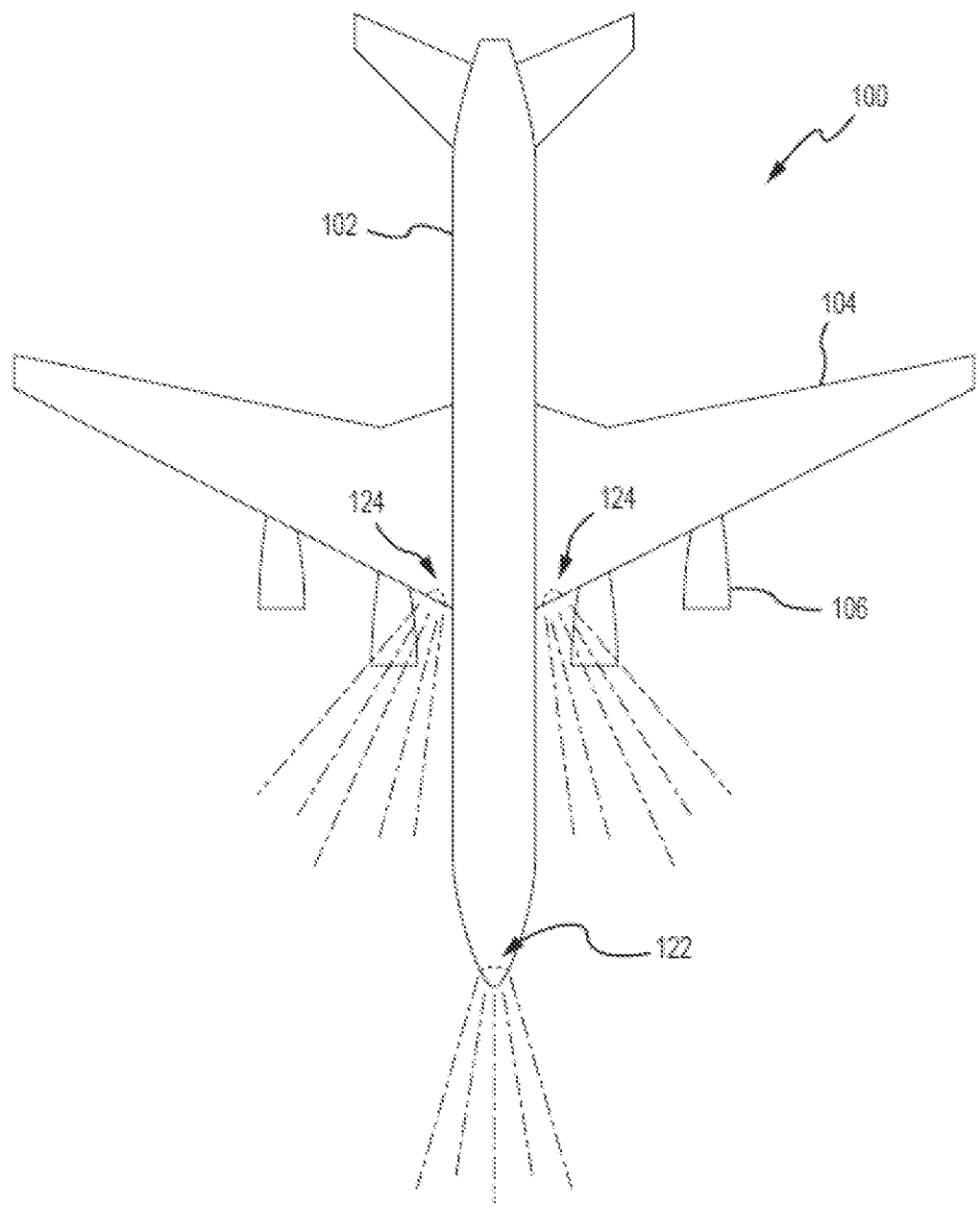
FIG. 2A illustrates a surface of an aircraft having a plurality of exterior light units, in accordance with various embodiments.
Figure 2B:
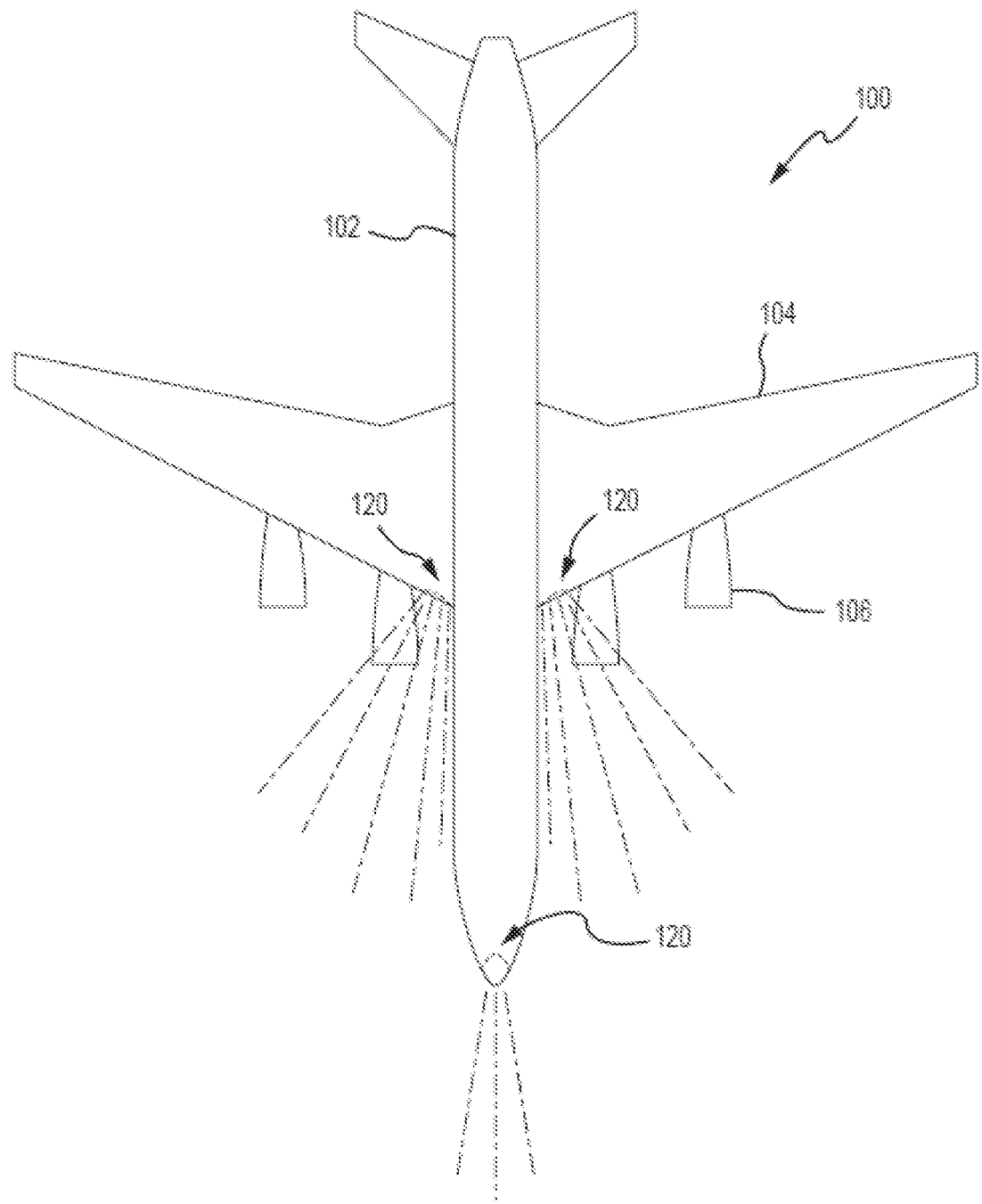
FIG. 2B illustrates a surface of an aircraft having a plurality of exterior light units, in accordance with various embodiments.

With reference to FIG. 1, an aircraft 100 in accordance with various embodiments may comprise aircraft systems, for example, one or more landing gear such as landing gear 12, which may generally support aircraft 100 when aircraft is not flying, allowing aircraft 100 to taxi, take off, and land without damage. Aircraft 100 may include one or more exterior lamps 14, or lighting units, such as, for example, landing lights 120, taxi lights 122, and navigation lights 126. Referring to FIGS. 2A and 2B, the aircraft 100 is illustrated according to various embodiments. The aircraft 100 includes a fuselage 102, a pair of wings 104, and a pair of engines 106 for each wing 104. The aircraft 100 include landing lights 120, taxi lights 122, and runway turnoff lights 124. These lights 120, 122, and 124 may be of any appropriate configuration and disposed at any appropriate location or combination of locations on the exterior of the aircraft 100. Aircraft 100 may include any number of other exterior lamps 14 such as logo lights, engine scan lights, anti-collision lights, strobe lights, beacon lights, cargo compartment lights, obstruction lights, landing gear lights, and/or the like.

Due to the effects of the ambient environment on the exterior lamps 14, the exterior lamps 14 may comprise a variety of pressure release mechanisms, for example, one or more pressure release valves. As fluid in the exterior lamp is collected in the ambient air, the valves may release the fluid to prevent damage to the exterior lamp.

Figure 3C:
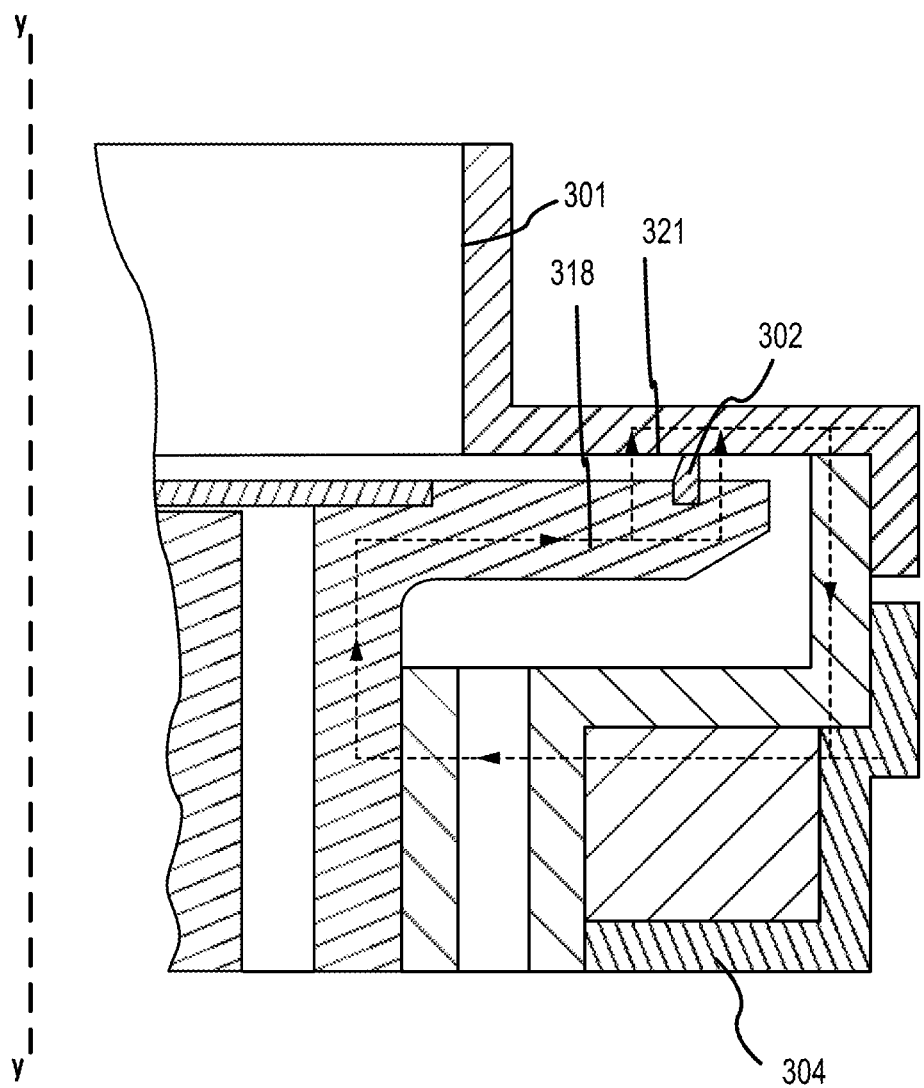
FIG. 3C illustrates a portion of a cross-section view of a magnetically controlled fluid drain valve for an exterior light unit, including a magnetic flux line, in accordance with various embodiments.

FIGS. 3A-3C illustrate cross-sections of a magnetically controlled fluid drain valve 300. As shown, the valve 300 may include an inlet fitting body 301, an inner body 322, an outer body 304, and a permanent magnet 312. In various embodiments, the inlet fitting body 301 may include a collar portion 305 and a shoulder portion 303. The collar portion 305 may at least partially define a lighting cavity 307. In various embodiments, the collar portion 305 may be configured to assemble at the lighting cavity 307 to a corresponding structure of the lighting housing. In various embodiments, and as shown by the y-y' axis in FIG. 3A, gravity may be in the negative y direction along the y-y axis. In various embodiments, liquid water, water vapor, and air, may flow from the lighting housing through the collar portion 305 in the negative y direction. In various embodiments, the collar portion 305 and the shoulder portion 303 may be comprised of different materials. The collar portion 305 may be comprised of a non-magnetic material, and the shoulder portion 303 may comprise a magnetic material. In various embodiments, the shoulder portion 303 may comprise an inner surface at least partially defining an air gap 309.

Figure 4:
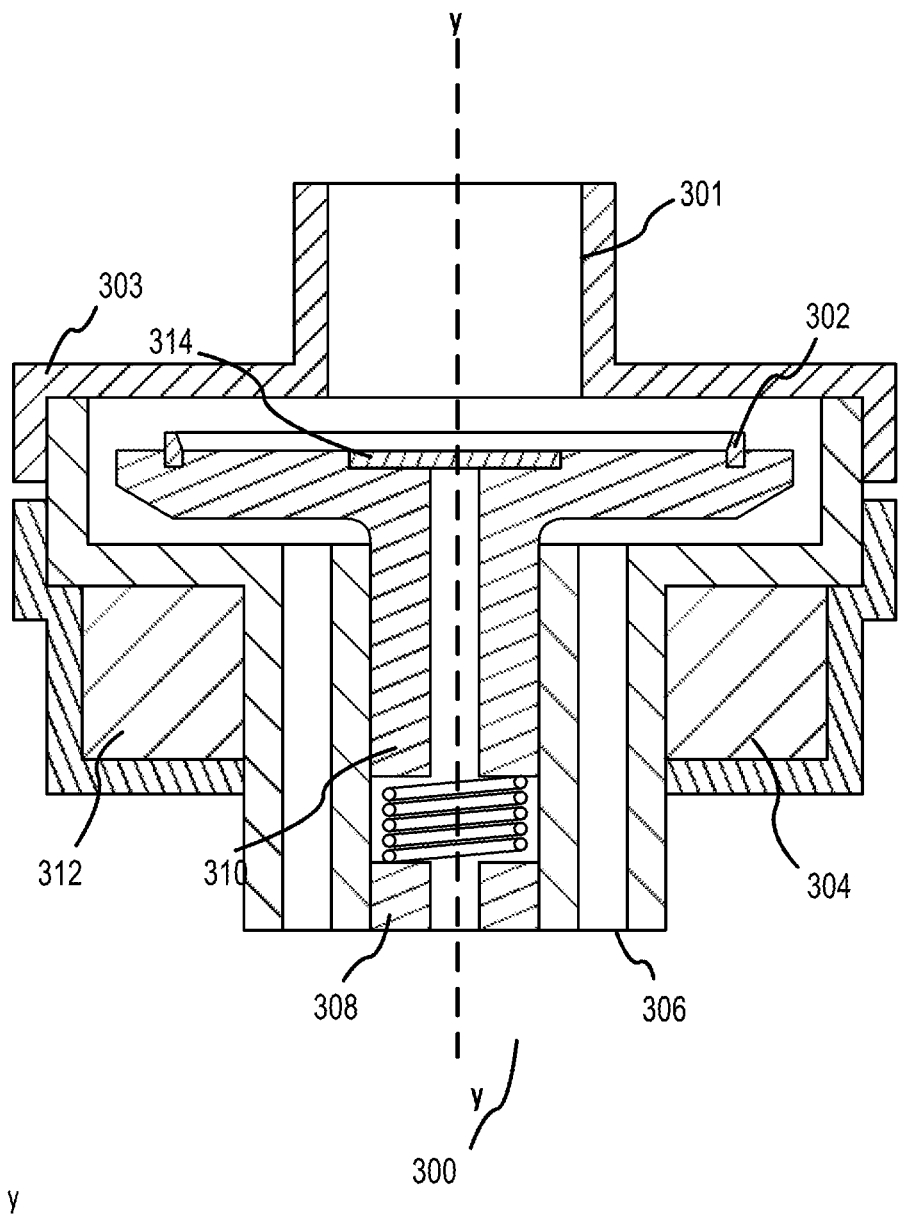
FIG. 4 illustrates a cross-section view of a magnetically controlled fluid drain valve for an exterior light unit, in accordance with various embodiments.

In accordance with various embodiments, and in further reference to FIGS. 3A and 4, the inner body 322 may include a poppet 310. As shown, the poppet 310 may be disposed between the inner surface of the shoulder portion 303 and a seat 308. In various embodiments, the seat 308 may be configured to support the poppet 310. In various embodiments, the seat 308 may be a spring. In various embodiments, the poppet 310 may be configured to sit flush against the inner surface of the shoulder portion 303. In other embodiments, the poppet 310 may have an annular groove configured to retain a polymer seal 302. The polymer seal 302 may be configured to couple the poppet 310 to the inner surface of the shoulder portion 303 of the inlet fitting body 301. In various embodiments, the inner surface of the shoulder portion 303 may be serrated to improve coupling of the polymer seal 302 to the inner surface of the shoulder portion 303. In various embodiments, the polymer seal 302 may be configured to retain the poppet 310 to the shoulder portion 303 in a seated position. In various embodiments, the polymer seal 302 may be an O-ring, or any substantially ring-like shape. As shown in FIG. 3A, the valve 300 may be in a closed position, and the poppet 310 in a seated position, when the polymer seal 302 is coupled to the inner surface of the shoulder portion 303. In various embodiments, the polymer seal 302 coupled to the inner surface of the shoulder portion 303 may prevent the ingress of fluid into the valve's 300 inner body 322.

Referring to FIGS. 3A and 3B, the poppet 310 may further comprise a poppet stem defining a channel 316. In various embodiments, the channel 316 may be configured to permit at least one of air and water vapor to pass therethrough. In doing so, the poppet 310 may be configured to control the flow of gas exchanged between the lighting unit and the external environment. In various embodiments, the poppet 310 may include a membrane 314. In various embodiments, the membrane 314 may be configured to overlay the poppet stem defining the channel 316. In various embodiments, the membrane 314 may be disposed within a diameter of the polymer seal 302.

In various embodiments, the membrane 314 may be semi-permeable and may be configured to permit air, water vapor, and other gases, to pass therethrough, exchanging gases with the external environment via the channel. It may be especially advantageous to allow water vapor to be exchanged to prevent its condensation into liquid water within the valve 300 and/or lighting housing. Some water vapor may condense and accumulate as liquid water along the semi-permeable membrane 314. In various embodiments, the membrane 314 may be impermeable to liquid water. In various embodiments, the membrane 314 may comprise expanded polytetrafluoroethylene.

Figure 6A:
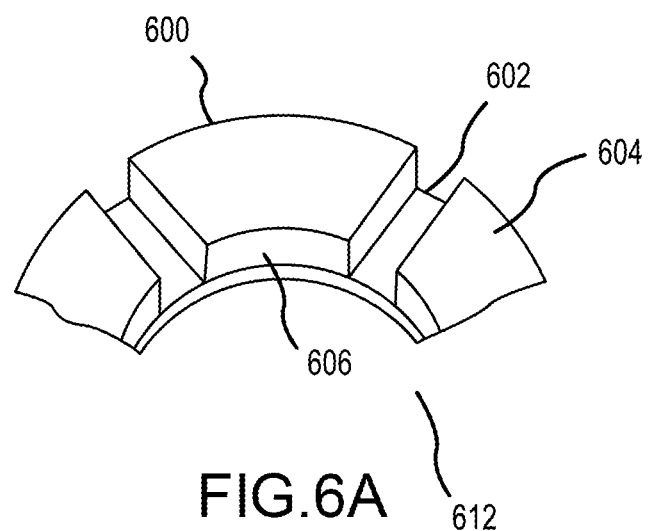
FIG. 6A illustrates a portion of a magnet, in accordance with various embodiments.
Figure 6B:
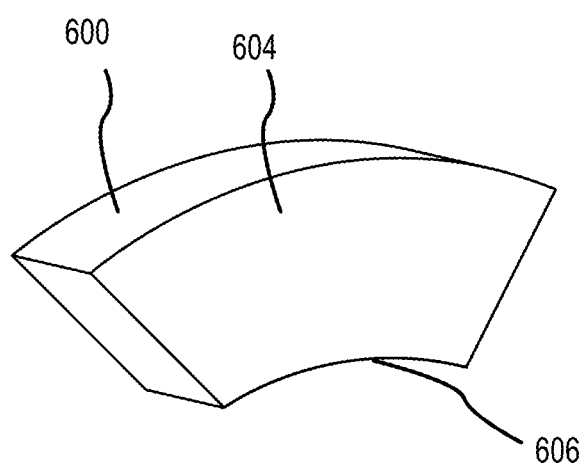
FIG. 6B illustrates a magnet segment, in accordance with various embodiments.

In further reference to FIGS. 3A-3C, a magnetically controlled fluid drain valve may further comprise a permanent magnet 312. In various embodiments, the magnet 312 may be disposed between the inner body 322 and the outer body 304. In various embodiments, and with further reference to FIGS. 6A and 6B, the magnet 612 may further comprise a plurality of annular segments 604. The plurality of annular segments 604 may define a plurality of recesses 602. In various embodiments, the magnet 612 may further comprise an inner cylindrical face 606 having a north pole and an outer cylindrical face 600 having a south pole. In various embodiments, the magnet may be radially polarized between the inner cylindrical face 606 and the outer cylindrical face 600, keeping the north pole and the south pole in the cylindrical faces.

In various embodiments, each recess 602 may extend between the inner cylindrical face 606 and the outer cylindrical face 600 of the magnet 612. To maintain optimal magnetic strength, it may be desirable to space the segments closer together, reducing recess width. In various embodiments, the magnet 612 may comprise at least one recess or no recess at all. In various embodiments, the magnet 612 may be a continuous, annular magnet.

As shown in FIG. 3B, the magnet 312 may be configured to induce a magnetic flux circuit 318. In various embodiments, the magnetic flux circuit 318 may comprise a plurality of closed loop paths containing a magnetic flux. In various embodiments, and in further reference to FIGS. 3A, 3C, and 6A, the magnetic flux circuit 318 may originate from the inner cylindrical face 606 of the magnet 612, flow through the inner body 322 and up the poppet 310, traverse the air gap into the magnetic shoulder portion 303 of the inlet fitting body, flow down the inner body 322 and into the outer body 304, and terminate at the outer cylindrical face 600 of the magnet 312.

In various embodiments, the inner body 322, the outer body 304, the poppet 310, and the shoulder portion 303 of the inlet fitting body 301 may be comprised of magnetically permeable materials, such as, for example, soft iron, iron, cobalt, steel, chromium steel, ferro-magnetic stainless steel, and the like. In various embodiments, the collar portion 305 of the inlet fitting body 301 may be comprised of non-magnetic materials, such as, for example, austenitic chromium-nickel stainless steel and low carbon versions thereof, and the like. In various embodiments, the magnet 312 may be comprised of, for example, samarium cobalt, or any other suitable magnet material. In various embodiments, the polymer seal 302 may be comprised of soft polymer materials, such as, for example, polytetrafluoroethylene (PTFE), tetrafluoroethylene, and the like.

In various embodiments, the magnetic flux circuit 318 may be fixed by the magnet design and the reluctance or resistance in the flux path. The primary reluctance is due to the air gap length, or the space defined by the inner surface of the shoulder portion 303 and the poppet 310. As shown in FIG. 3C, while traversing the air gap into the magnetic shoulder portion 303, the flux generates opposing pole faces 321 across the air gap, generating magnetic force. Referring to FIG. 3B, in various embodiments, the magnetic force across the air gap may be configured to attract the poppet 310 to the inner surface of the shoulder portion 303, closing the valve 300. This magnetic force may close the valve 300 and may be configured to induce a compressive sealing stress of the polymer seal 302 against the inner face of the shoulder portion 303, keeping the valve 300 in closed position and the poppet 310 in a seated position.

However, magnetic force generated by the magnetic flux circuit 318 is not the only force acting on the poppet 310. In various embodiments, the pressure of the liquid water accumulating along and trapped by the semi-permeable membrane 314 may be influenced by the pressure differences between the light unit and the external environment. In various embodiments, and as shown in FIG. 4, in response to the pressure force of the light unit exceeding the magnetic force, the light unit pressure may act on the trapped liquid along the poppet 310, pushing the poppet 310 in the negative y direction along the y-y axis onto the seat 308 and out the seated position. This increases the air gap defined by the shoulder portion 303 and decouples the polymer seal 302 from the inner face of the shoulder portion 303.

Figure 5A:
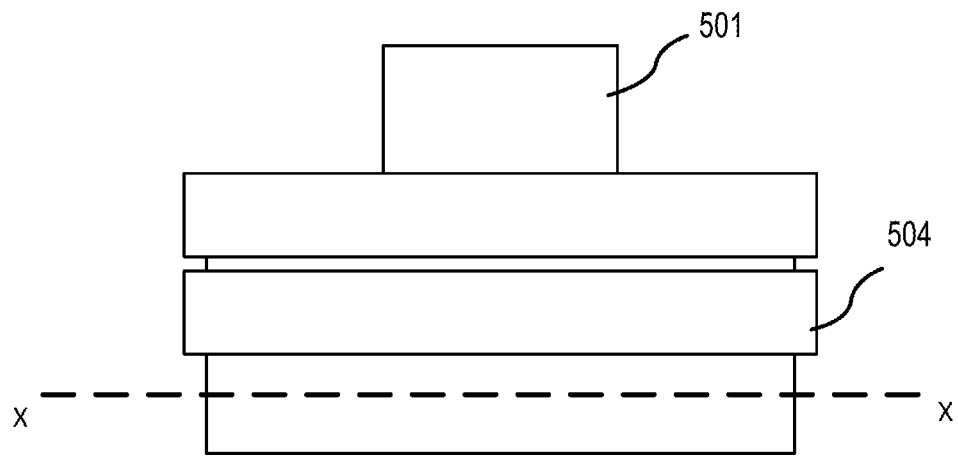
FIG. 5A illustrates a side view of a valve assembly for an exterior light unit, in accordance with various embodiments.
Figure 5B:
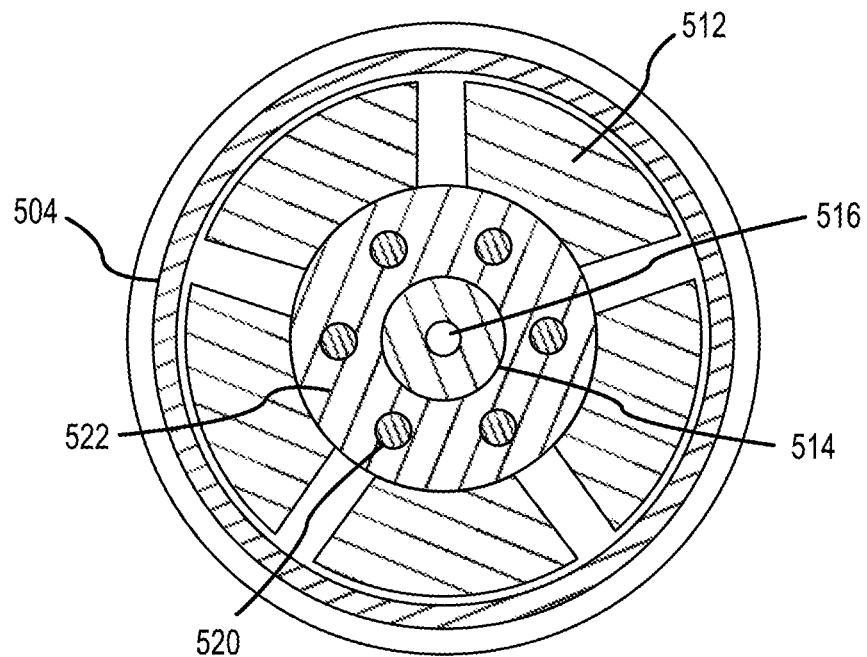
FIG. 5B illustrates a cross-section view of a valve assembly for an exterior light unit, in accordance with various embodiments.

FIG. 5B illustrates a cross-section along the x-x axis of FIG. 5A. As shown, and in various embodiments, the inner bod' 522 may define a plurality of cavities 520. In various embodiments, the cavities 520 may be configured to permit liquid water to drain from the upstream lighting housing. In further reference to FIGS. 3B and 4, 306 is later referred to as cavities. In various embodiments, while the valve 300 is in a closed position, and the poppet 310 is in a seated position, the liquid water may be blocked from entering the cavities b' the polymer seal 302. As the polymer seal 302 decouples from the inner face of the shoulder portion 303, the liquid water may exit the valve 300 via the cavities 306. The semi-permeable membrane 314 overlaying the channel 316 remains impermeable to liquid water. Thus, as the valve 300 opens and the poppet 310 moves in the negative y direction along the y-y axis of the inner body 322, the cavities 306 may act as a primary liquid water drain, while the channel remains an air/water vapor exchange. When the valve is in the closed position, in various embodiments, the polymer seal 302 may prevent secondary leakage into the cavities 306.

In general, and as shown in FIG. 4, the poppet 310 may be transmitted linearly within the inner body 322 in response to a force acting upon it at the inner surface air gap. This force may be, for example, the pressure of the liquid water acting on the poppet or the magnetic force attracting the poppet to the inner surface of the shoulder portion.

FIGS. 7A and 7B illustrate a particular benefit of the magnetically controlled fluid drain valve shown in previous figured. The magnetic force is proportional to the pole face area and the square of the magnetic flux density available across the air gap. As demonstrated in FIG. 7B, as the air gap defined by the shoulder portion 303 increases, pushing the valve 300 open from the closed position, the magnetic force across the air gap decreases. As liquid water is vented into the external environment as the valve 300 is open, the pressure within the lighting unit may equalize with that of the external environment, reducing the pressure force within the lighting unit and valve 300 relative to that of the magnetic force generated by the magnetic flux circuit 318. As the magnetic force exceeds the pressure acting on the poppet 310, the magnetic force generated by the magnetic flux circuit 318 traversing across the air gap attracts the poppet 310 back to the inner face of the shoulder portion 303, reducing the size of the air gap. The magnetic force continues to increase as the air gap decreases, urging the polymer seal 302 into the inner face of the shoulder portion 303 and inducing compressive stress once more.

Furthermore, as shown in FIG. 7A, it may be desirable to choose a seat 308, or spring, that may exert de minimus force onto the poppet 310, especially as the poppet 310 moves in the negative y direction along the y-y axis within the inner body 322 as the valve 300 opens. If the seat force acting on the poppet 310 as the valve opens were to exceed the minimum magnetic force, then the seat 308, rather than the magnet 312 would determine when the valve closes. This may be less desirable, since the seat 308 may force the valve 300 closed before all the liquid water is drained. For example, in a typical spring-based valve, as the valve opens, a spring with a high spring rate is more likely to close the valve shut before the water drains. The spring constant of a given coil spring, rather than the pressure within the light unit, would determine the timing of valve closure.

Conversely, in relying on magnetic force tied to the pressure within the lighting unit, the valve 300 may stay open longer as the pressure between the lighting unit and the external environment equalizes, increasing the likelihood that the liquid water is fully drained. In sum, as the air gap increases, the magnetic force decreases, ensuring that less force will oppose the poppet 310 as the valve opens, and effectively creating a negative spring rate to keep the valve 300 open longer. The relationship between the lighting unit pressure and the magnetic force determines the timing of valve actuation (i.e., opening and closing), rather than any force exerted by the seat 308.

Figure 8:
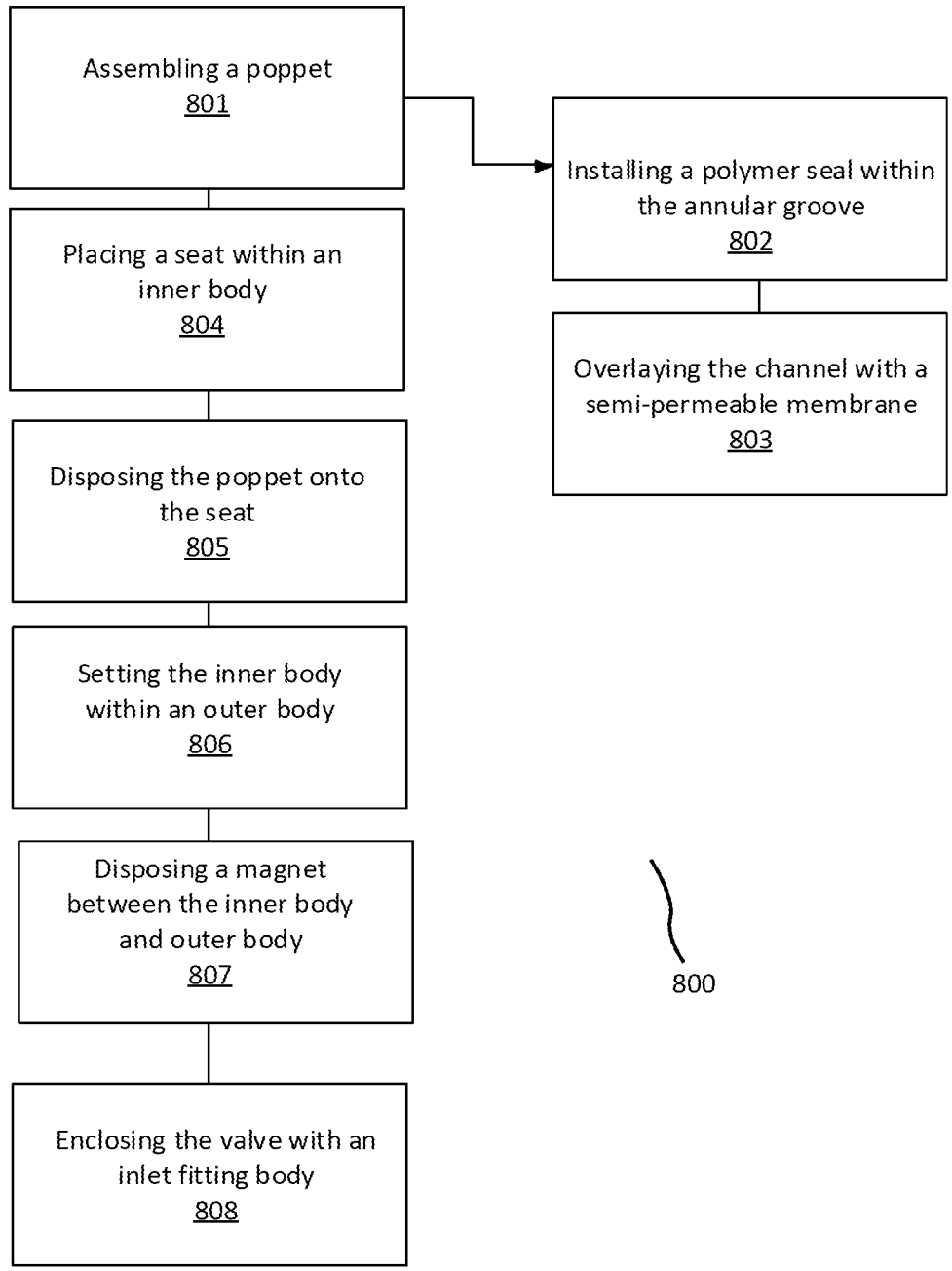
FIG. 8 illustrates a method of assembling a valve of an aircraft light unit, in accordance with various embodiments.

FIG. 8 illustrates a method 800 of assembling the valve 300. As shown, and in further reference to FIGS. 3A-C, the method 800 may comprise assembling 801 a poppet 310. The poppet 310 may comprise a poppet stem defining a channel 316. In various embodiments, the channel 316 may be configured to permit at least one of air and water vapor to pass therethrough. In various embodiments, the poppet 310 may further comprise a planar face 325 defining an annular groove. In various embodiments, assembling 801 the poppet 310 may further comprise installing 802 a polymer seal 302 within the annular groove. The polymer seal 302 may be an O-ring. In various embodiments, assembling 801 the poppet 310 may further comprise overlaying 803 the channel 316 with a semi-permeable membrane 314. The semi-permeable membrane 314 may be configured to permit at least one of air and water vapor to pass into the channel 316. The semi-permeable membrane 314 may be further configured to be impermeable to liquid water. The liquid water may accumulate along the membrane 314.

In various embodiments, the method of assembling 800 the valve 300 may further comprise placing 804 a seat 308 within an inner body 322 of the valve 300. In various embodiments, the method 800 may further comprise disposing 805 the poppet 310 onto the seat 308 within the inner body 322. The seat 308 may be configured to support the poppet 310. The inner body 322 may be configured to house the poppet 310 and the seat 308. In various embodiments, the method 800 may further comprise setting 806 the inner body 322 within an outer body 304. The outer body 304 may be configured to ring the inner body 322. In various embodiments, setting 806 the inner body 322 within the outer body 304 may define a recess between the inner body 322 and the outer body 304. In various embodiments, the method of assembling 800 the valve may further comprise disposing 807 a permanent magnet 312 within the recess between the inner body 322 and the outer body 304. In further reference to FIGS. 6A-B, the magnet 312 may further comprise an inner cylindrical face 606 having a north pole and an outer cylindrical face 600 having a south pole.

In various embodiments, the method of assembling 800 the valve 300 may further comprise enclosing 808 the valve 300 with an inlet fitting body 301. The inlet fitting body 301 may be configured to cover the inner body 322, the magnet 312, and the outer body 304. The inlet fitting body 301 may comprise a shoulder portion 303 and a collar portion 305. In various embodiments, the shoulder portion 303 may comprise an inner surface that at least partially defines an air gap 309. In various embodiments, the collar portion 305 may at least partially define a lighting cavity 307. In various embodiments, the collar portion may be configured to couple to a lighting housing of a lighting unit at the lighting cavity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. An aircraft light unit, the aircraft light unit comprising:
a lighting housing, wherein the lighting housing is coupled to a valve, wherein the valve further comprises:

an inlet fitting body having a non-magnetic collar portion and a magnetic shoulder portion, wherein the non-magnetic collar portion at least partially defines a lighting cavity and couples to the lighting housing at the lighting cavity, wherein the magnetic shoulder portion comprises an inner surface at least partially defining an airgap;

an inner body having a poppet disposed between the inner surface of the shoulder portion and a seat, wherein the seat is configured to support the poppet; and a permanent magnet disposed between the inner body and an outer body of the valve, wherein the magnet further comprises an inner cylindrical face having a north pole and an outer cylindrical face having a south pole, wherein the magnet of the valve is configured to induce a magnetic flux circuit, wherein the magnetic flux circuit induced by the magnet comprises a plurality of closed loop paths containing a magnetic flux, wherein the magnetic flux originates from the inner cylindrical face of the magnet, flows through the inner body and up the poppet, traverses the air gap into the magnetic shoulder portion of the inlet fitting body, flows down the inner body and into the outer body, and terminates at the outer cylindrical face of the magnet.

2. The aircraft light unit of claim 1, wherein the poppet further comprises a poppet stem.

3. The aircraft light unit of claim 2, wherein the poppet stem defines a channel, wherein the channel is configured to permit at least one of air and water vapor to pass therethrough.

4. The aircraft light unit of claim 3, wherein the poppet further comprises a membrane, wherein the membrane is a semi-permeable membrane configured to overlay the poppet stem defining the channel.

5. The aircraft light unit of claim 4, wherein the semi-permeable membrane is further configured to permit at least one of air and water vapor to pass therethrough.

6. The aircraft light unit of claim 5, wherein the semi-permeable membrane is further configured to be impermeable to liquid water.

7. The aircraft light unit of claim 1, wherein the magnet is radially polarized between the inner cylindrical face and the outer cylindrical face.

8. The aircraft light unit of claim 1, wherein the magnet comprises a plurality of annular segments.

9. The aircraft light unit of claim 8, wherein the plurality of annular segments defines a plurality of recesses, wherein each recess extends between the inner cylindrical face and the outer cylindrical face of the magnet.

10. The aircraft light unit of claim 1, wherein the magnet is a continuous, annular magnet.

11. The aircraft light unit of claim 1, wherein the non-magnetic collar portion is downstream of the lighting housing.

12. The aircraft light unit of claim 11, wherein the inner body defines a plurality of cavities, wherein the plurality of cavities is configured to permit water to drain in a negative y direction from the lighting housing.

13. A valve for an exterior aircraft light unit, the valve comprising:

an inlet fitting body having a non-magnetic collar portion and a magnetic shoulder portion, wherein the non-magnetic collar portion at least partially defines a lighting cavity, wherein the magnetic shoulder portion comprises an inner surface at least partially defining an air gap;

an inner body, comprising:
a poppet disposed between the inner surface of the shoulder portion and a seat, wherein the seat is configured to support the poppet, wherein the poppet further comprises a poppet stem defining a channel, wherein the channel is configured to permit at least one of air and water vapor to pass therethrough;

a polymer seal retained within an annular groove of the poppet, wherein the polymer seal is configured to couple the poppet to the inner surface of the shoulder portion of the inlet fitting body;

a semi-permeable membrane configured to overlay the poppet stem defining the channel, wherein the semi-permeable membrane is configured to permit at least one of air and water vapor to pass into the channel, wherein the semi-permeable membrane is further configured to be impermeable to liquid water, wherein liquid water is configured to accumulate along the membrane; and a permanent magnet disposed between the inner body and an outer body of the valve, wherein the magnet further comprises an inner cylindrical face having a north pole and an outer cylindrical face having a south pole, wherein the magnet of the valve is configured to induce a magnetic flux circuit, wherein the magnetic flux circuit induced by the magnet comprises a plurality of closed loop paths containing a magnetic flux, wherein the magnetic flux originates from the inner cylindrical face of the magnet, flows through the inner body and up the poppet, traverses the air gap into the magnetic shoulder portion of the inlet fitting body, flows down the inner body and into the outer body, and terminates at the outer cylindrical face of the magnet.

14. The valve of claim 13, wherein the polymer seal is an O-ring.

15. The valve of claim 13, wherein the magnetic flux traversing across the air gap develops a magnetic force across the air gap, wherein the magnetic force across the air gap is configured to attract the poppet to the inner surface of the shoulder portion, wherein the magnetic force is configured to close the valve.

16. The valve of claim 15, wherein the polymer seal is configured to retain the poppet to the shoulder portion in a seated position.

17. The valve of claim 16, wherein the poppet is configured to move out of the seated position and open the valve when the magnetic force across the air gap is exceeded by a pressure force of the liquid water acting on the poppet, wherein the magnetic force across the air gap decreases as the valve opens.

18. The valve of claim 17, wherein the inner body defines a plurality of cavities, wherein the plurality of cavities is configured to permit water to drain out of the valve as the valve opens, wherein the pressure force of the impermeable liquid water accumulated along the semi-permeable membrane decreases as the water drains out of the valve.

19. The valve of claim 18, wherein the magnetic force across the air gap is configured to increase as the pressure force of the liquid water within the valve decreases, wherein the increasing magnetic force across the air gap shifts the poppet back into the seated position.

20. A method of assembling a valve for an aircraft light unit, the method comprising:

assembling a poppet, wherein the poppet further comprises a poppet stem defining a channel, wherein the channel is configured to permit at least one of air and water vapor to pass therethrough, wherein the poppet further comprises a planar face defining an annular groove, the assembling further comprising:
  installing a polymer seal within the annular groove, wherein the polymer seal is an O-ring; and
  overlaying the channel with a semi-permeable membrane, wherein the semi-permeable membrane is configured to permit at least one of air and water vapor to pass into the channel, wherein the semi-permeable membrane is further configured to be impermeable to liquid water, wherein liquid water is configured to accumulate along the membrane;
placing a seat within an inner body of the valve;
disposing the poppet onto the seat within the inner body, wherein the seat is configured to support the poppet, wherein the inner body is configured to house the poppet and the seat;
setting the inner body within an outer body, wherein the outer body is configured to ring the inner body, wherein setting the inner body within the outer body defines a recess between the inner body and the outer body;
disposing a permanent magnet within the recess between the inner body and the outer body, wherein the magnet further comprises an inner cylindrical face having a north pole and an outer cylindrical face having a south pole; and
enclosing the valve with an inlet fitting body, wherein the inlet fitting body is configured to cover the inner body, the magnet, and the outer body, wherein the inlet fitting body comprises a shoulder portion and a collar portion, wherein the collar portion at least partially defines a lighting cavity, wherein the collar portion is configured to couple to a lighting housing of a lighting unit at the lighting cavity.

* * * * *